United States Patent
Howard et al.

(10) Patent No.: US 12,289,237 B1
(45) Date of Patent: Apr. 29, 2025

(54) SYSTEM AND METHOD FOR HEURISTICALLY-ACTUALIZED PARALLEL PROCESSING IMPROVEMENT

(71) Applicant: Rockwell Collins, Inc., Cedar Rapids, IA (US)

(72) Inventors: Sean D. Howard, Cedar Rapids, IA (US); Meghan K. Anderson, Elkhorn, NE (US); Gabriel W. Schive, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 444 days.

(21) Appl. No.: 17/844,604

(22) Filed: Jun. 20, 2022

(51) Int. Cl.
  *H04L 45/7453* (2022.01)
  *H04L 69/08* (2022.01)

(52) U.S. Cl.
  CPC ......... *H04L 45/7453* (2013.01); *H04L 69/08* (2013.01)

(58) Field of Classification Search
  CPC .... H04L 45/7453; H04L 69/08; H04L 69/085
  See application file for complete search history.

(56) References Cited

U.S. PATENT DOCUMENTS

| | | |
|---|---|---|
| 8,938,795 B2 | 1/2015 | Clarke et al. |
| 10,999,262 B1 | 5/2021 | Ramanujan et al. |
| 11,218,446 B2 | 1/2022 | Leon |
| 2010/0046542 A1* | 2/2010 | van Zelst ............... H04L 1/005 375/267 |
| 2016/0065460 A1* | 3/2016 | Fan ......................... H04L 45/52 370/465 |
| 2018/0375841 A1 | 12/2018 | Tola |
| 2020/0036732 A1* | 1/2020 | Grubel ................. G06F 21/564 |
| 2020/0280876 A1* | 9/2020 | Sridharan ............. H04W 28/06 |
| 2021/0392080 A1 | 12/2021 | Shen et al. |
| 2023/0412518 A1* | 12/2023 | Zheng .................... H04L 47/32 |

FOREIGN PATENT DOCUMENTS

| | | |
|---|---|---|
| CN | 102045344 A | 5/2011 |
| CN | 102970230 A | 3/2013 |
| CN | 105846982 A | 8/2016 |
| CN | 107967550 A | 4/2018 |

* cited by examiner

*Primary Examiner* — Sun Jong Kim
(74) *Attorney, Agent, or Firm* — Suiter Swantz IP (57) ABSTRACT

A system and method for performing cross-domain communication between a first domain and a second domain is disclosed. The system includes a controller configured to receive a data packet and output an approved data packet. The system includes processors and memory that instruct the processors to receiving a data packet from the first domain, deconstruct the data packet into subcomponents, apply a subcomponent-specific guard rule to a corresponding subcomponent, determine if each of the subcomponents have been approved by an application of the subcomponent specific guard rules, and upon a determination that each of the subcomponents have been approved, merge the subcomponents into the approved data packet. The system and method also include transmitting the approved data packet.

10 Claims, 7 Drawing Sheets

SYSTEM AND METHOD FOR HEURISTICALLY-ACTUALIZED PARALLEL PROCESSING IMPROVEMENT

BACKGROUND

Cross-domain security solutions (e.g., solutions governing the secure transfer of data between domains of differing security classifications) require the processing of data against a ruleset for approval before crossing classified boundaries to determine if the data can be shared with appropriate entities. Incoming data may come from a variety of transfer systems/modes, including Ethernet. Ethernet data traffic is ever increasing in speed, with many military and commercial ethernet systems transferring over 100 gigabits per second. This increased data traffic is problematic for cross-domain systems. For example, many current cross-domain systems cannot keep up with high data transfer speeds without increasing processing capacity, which may lead to large upfront costs. Accordingly, there is a need for a cross-domain system or method that can process high traffic data without incurring the high costs associated with previous systems and methods.

SUMMARY

A method for performing cross-domain communication between at least a first domain and a second domain is disclosed. In one or more embodiments, the method includes receiving a data packet from the first domain. In one or more embodiments, the method further includes deconstructing the data packet into subcomponents. In one or more embodiments, the method further includes applying a subcomponent-specific guard rule to the subcomponents. In one or more embodiments, the method further includes determining if each of the subcomponents have been approved by an application of the subcomponent specific guard rules. In one or more embodiments, the method further includes upon a determination that each of the subcomponents have been approved, merging the subcomponents into an approved data packet. In one or more embodiments, the method further includes transmitting the approved data packet to the second domain.

In some embodiments of the method, each of the at least the first domain and the second domain comprise differing security classifications.

In some embodiments of the method, the data packet comprises an Ethernet header, an IP header, a UDP/TCP header, and an application payload.

In some embodiments of the method, deconstructing the data packet into the subcomponents comprises deconstructing the data packet into a first subcomponent and a second subcomponent, wherein the first subcomponent and the second subcomponent each comprise at least one of the Ethernet header, the IP header, the UDP/TCP header, and the application payload.

In some embodiments of the method deconstructing the data packet into the subcomponents comprises deconstructing the data packet into a first subcomponent, a second subcomponent, and a third subcomponent, wherein the first subcomponent, the second subcomponent, and the third subcomponent each comprise at least one of the Ethernet header, the IP header, the UDP/TCP header, and the application payload.

In some embodiments of the method deconstructing the data packet into the subcomponents comprises deconstructing the data packet into a first subcomponent, a second subcomponent, a third subcomponent, and a fourth subcomponent, wherein the first subcomponent, the second subcomponent, the third subcomponent, and the fourth subcomponent each comprise at least one of the Ethernet header, the IP header, the UDP/TCP header, and the application payload.

In some embodiments of the method, the method further includes generating a hash for the data packet or at least one subcomponent of each data packet.

In some embodiments of the method, the method further includes comprising storing a hash of an approved data packet or approved subcomponent in an approved hash database.

In some embodiments of the method, the method further includes generating a subsequent hash for a subsequent data packet or a subsequent subcomponent. In some embodiments of the method, the method further includes comparing the subsequent hash to stored hashes in the approved hash database. In some embodiments of the method, the method further includes, upon identifying the subsequent hash in the approved hash database, at least one of merging the subsequent subcomponents of the subsequent data packet to form a subsequent approved data packet without applying the subcomponent specific guard rule to the subsequent subcomponents or sending the subsequent data packet to the second domain without deconstructing the subsequent data packet.

In some embodiments of the method, the method further includes, upon a determination that the subsequent hash is not identified in the approved hash database, continuing to apply the subcomponent specific guard rule to the subcomponents of the subsequent data packet.

In some embodiments of the method, the method further includes, upon a determination that each of the subcomponents are not approved, rejecting the data packet.

In some embodiments of the method, the method further includes logging the rejected data packet in a rejection database.

In some embodiments of the method, the method further includes sending the subcomponents to subcomponent-specific processing units.

In some embodiments of the method, the method further includes, upon identifying a subsequent hash in an approved hash database, merging subsequent subcomponents of a subsequent data packet into a subsequent approved data packet without applying the subcomponent specific guard rule to the subsequent subcomponents.

A system for cross-domain communication between at least a first domain and a second domain is disclosed. In one or more embodiments, the system includes a data input port for receiving a data packet from a first domain. In one or more embodiments, the one or more embodiments include a controller configured to receive the data packet and to output an approved data packet to a data output port. In one or more embodiments, the controller includes one or more processors and a memory with instructions stored upon that, when executed by the one or more processors, cause the one or more processors to receive the data packet from the first domain and deconstruct the data packet into subcomponents. In one or more embodiments, the instructions further instruct the one or more processors to apply a subcomponent-specific guard rule to a corresponding subcomponent and determine if each of the subcomponents have been approved by an application of the subcomponent specific guard rules. In one or more embodiments, the instructions further instruct the one or more processors to, upon a determination that each of the subcomponents have been approved, merge the subcomponents into the approved data packet. In one or more embodiments, the instructions further instruct the one or more processors to transmit the approved data packet to the data output port.

In some embodiments of the system, the at least the first domain and the second domain comprise differing security classifications.

In some embodiments of the system the data packet comprises an Ethernet header, IP header, a UDP/TCP header, and an application payload.

In some embodiments of the system, deconstructing the data packet into the subcomponents comprises deconstructing the data packet into a first subcomponent, a second subcomponent, a third subcomponent, and a fourth component, wherein the first subcomponent, the second subcomponent, the third subcomponent, and the fourth subcomponent each comprise at least one of the Ethernet header IP header, the UDP/TCP header, and the application payload.

In some embodiments of the system the one or more processors includes one or more filter engines configured to apply the subcomponent-specific guard rule to the corresponding subcomponents.

In some embodiments of the system two or more subcomponents from a same packet are processed by the subcomponent-specific filter engines on separate processors.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for providing cross-domain communication between at least a first domain and a second domain is disclosed. The method includes receiving a data packed, such as an Ethernet data packed, and deconstructing the Ethernet packet into smaller subcomponents that can be readily applied to guard rules via filter engines. Each packet subcomponent is processed independently, which increases the speed by which the packets can be processed. After the packet subcomponents have been approved, the packet subcomponents are merged and sent to the second domain. A hashing protocol may also be instituted within the method, wherein a hash is generated for a data packet, or a packet subcomponent before the guard rules are applied. If the hash value matches the hash value of a formerly approved data packet, the packet will be passed along without guard rule processing. The parallel processing-based system and method provides a highly streamlined, heuristic approach to cross-domain operation, with a severalfold increase in packet processing efficiency over current application.

Figure 1:
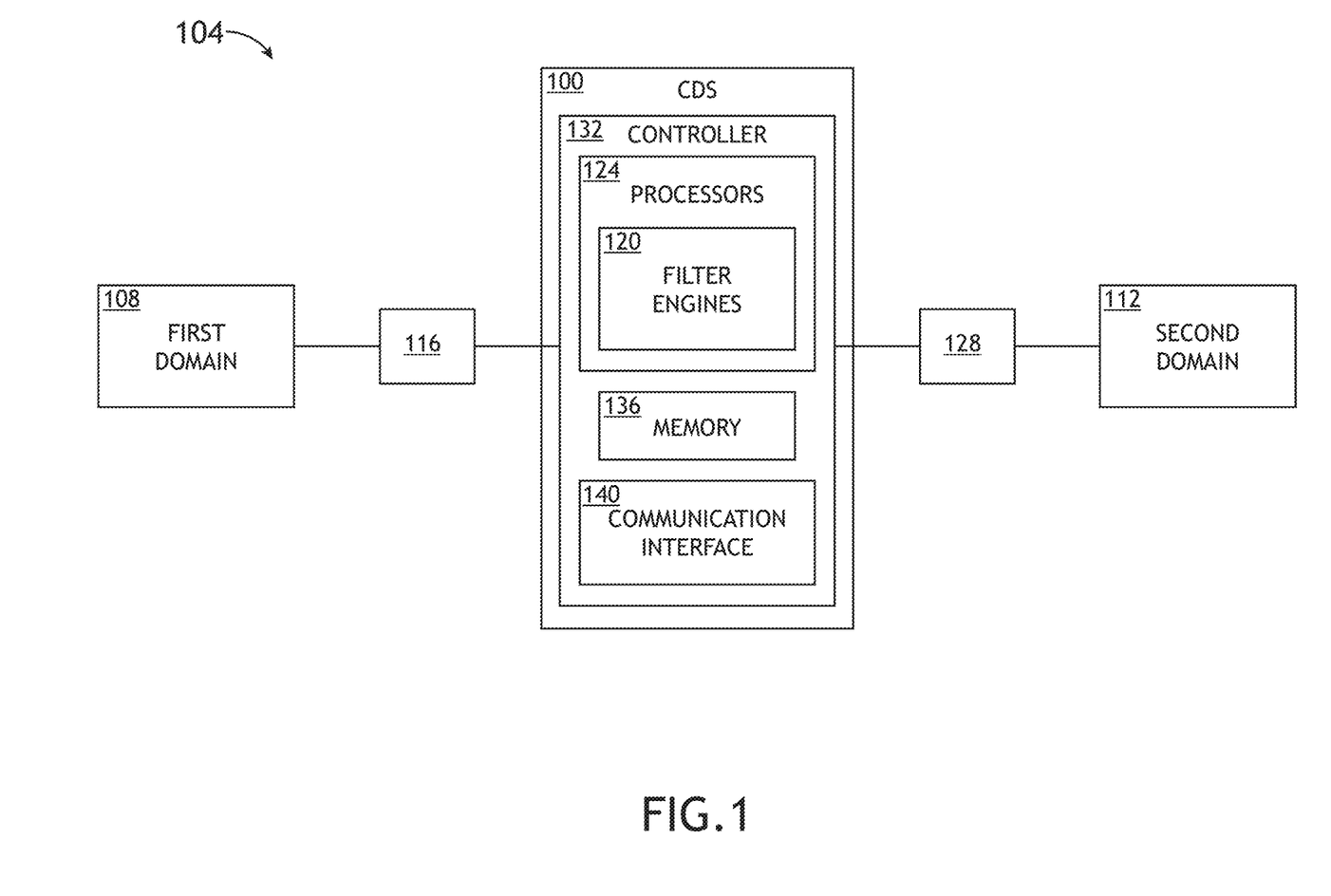
FIG. 1 is a block diagram illustrating a cross-domain system (CDS) operating within an environment, in accordance with one or more embodiments of the disclosure.

FIG. 1 is a block diagram illustrating a cross-domain system (CDS) 100 operating within an environment 104 in accordance with one or more embodiments of the disclosure. The CDS 100 operates to securely control the flow of information from a first domain 108 to a second domain 112, where the first domain 108 and second domain 112 have different rules for sending and receiving information (e.g., different security classifications of different security levels), For example the first domain 108 may be configured as a high-security communication system (e.g., a communication system for a federal military agency) in communication with a second domain 108 configured as a low-security communication system (e.g., a communication system of local law enforcement). The CDS 100, receives electronic communications (e.g., data packets) from the first domain 108 via a data input port 116, and upon using one or more filter engines 120 and other functions from one or more processors 124, determines whether the electronic communications are approved for sending to the second domain 112 via a data output port 128. The data input port 116, data output port 128, and other componentry of the CDS 100 are configured to support data link protocols, such as Ethernet transport protocols.

The CDS 100 may provide cross-domain communication functions for any number of domains with any number of security classification. For example, the CDS 100 may provide cross-domain communication functions for three or more domains, for 30 or more domains, or for 300 or more domains. In another example, the CDS 100 may provide cross-domain communication functions for domains having three or more security classifications, for 30 or more security classifications, or for 300 or more security classifications. The CDS may also provide bidirectional cross-domain functions between any two domains. For example, the first domain 108 may be configured as a high-security communication system for military agency in communication with a second domain configured as a hospital communication system, wherein the CDS 100 prevents the transfer of sensitive military data from the first domain 108 to the second domain 112 and prevents the transfer of sensitive medical data from the second domain 112 to the first domain 108. The CDS may include a controller 132 configured to perform the functions of the CDS 100 as described herein (e.g., data processing and data transfer). The controller includes the one or more processors 124, memory 136, and a communication interface.

The one or more processors 124 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 124 may include any device configured to execute algorithms and/or instructions (e.g., program instructions stored in memory 136). In embodiments, the one or more processors 124 may be embodied as a central processing unit (CPU), laptop computer, networked computer, or any other computer system configured to execute a program configured to operate the CDS 100, as described throughout the present disclosure. Moreover, different subsystems of the CDS 100, or multiple parallel processing units within the CDS 100, may include a processor or logic elements suitable for carrying out at least a portion of the steps described in the present disclosure. Therefore, the above description should not be interpreted as a limitation on the embodiments of the present disclosure but merely as an illustration.

The memory 136 may include any storage medium known in the art suitable for storing the one or more sets of program instructions executable by the associated one or more processors 124 (e.g., the instructions, when executed by the one or more processors 124, causing the one or more processors 124 to perform functions of the CDS 100). For example, the memory 136 may include a non-transitory memory medium. For instance, the memory 136 may include, but is not limited to, a read-only memory (ROM), a random-access memory (RAM), a magnetic or optical memory device (e.g., disk), a magnetic tape, a solid-state drive, and the like. The memory 136 may be configured to provide information to the CDS 100, to CDS 100 subsystems, and/or CDS-linked systems (e.g., componentry relating to, or integrated with, the first domain 108 and/or second domain 112). In addition, the memory 136 may be configured to store user input (e.g., data from the first domain 108 and/or second domain 112). The memory 136 may be housed in a common controller housing with the one or more processors 124. The memory 136 may, alternatively or in addition, be located remotely with respect to the spatial location of the processors 124, or the one or more controller 132. For example, the one or more processors 124 and/or one or more controller 132 may access a remote memory 136 accessible through a network (e.g., wireless, and the like) via one or more communication interface 140. The memory 136 may be used to store data packets 200, data packet components, guard rules 320, hashes, and other data required by the CDS 100.

The communication interface 140 may be operatively configured to communicate with components of the one or more controller 132 or any other componentry within the CDS 100. For example, the one or more communication interface 140 may be configured to retrieve data from the one or more processors 124 or other devices, transmit data for storage in the memory 136, retrieve data from storage in the memory 136, and so forth. The one or more communication interface 140 may also be communicatively coupled with the one or more processors 124 to facilitate data transfer between components of the one or more controller 132 and the one or more processors 124. It should be noted that while the one or more communication interface 140 is described as a component of the one or more controller 132, one or more components of the one or more communication interface 140 may be implemented as external components communicatively coupled to the one or more controller 132 via a wired and/or wireless connection. The one or more controller 132 may also include and/or connect to one or more user interfaces.

Figure 2:
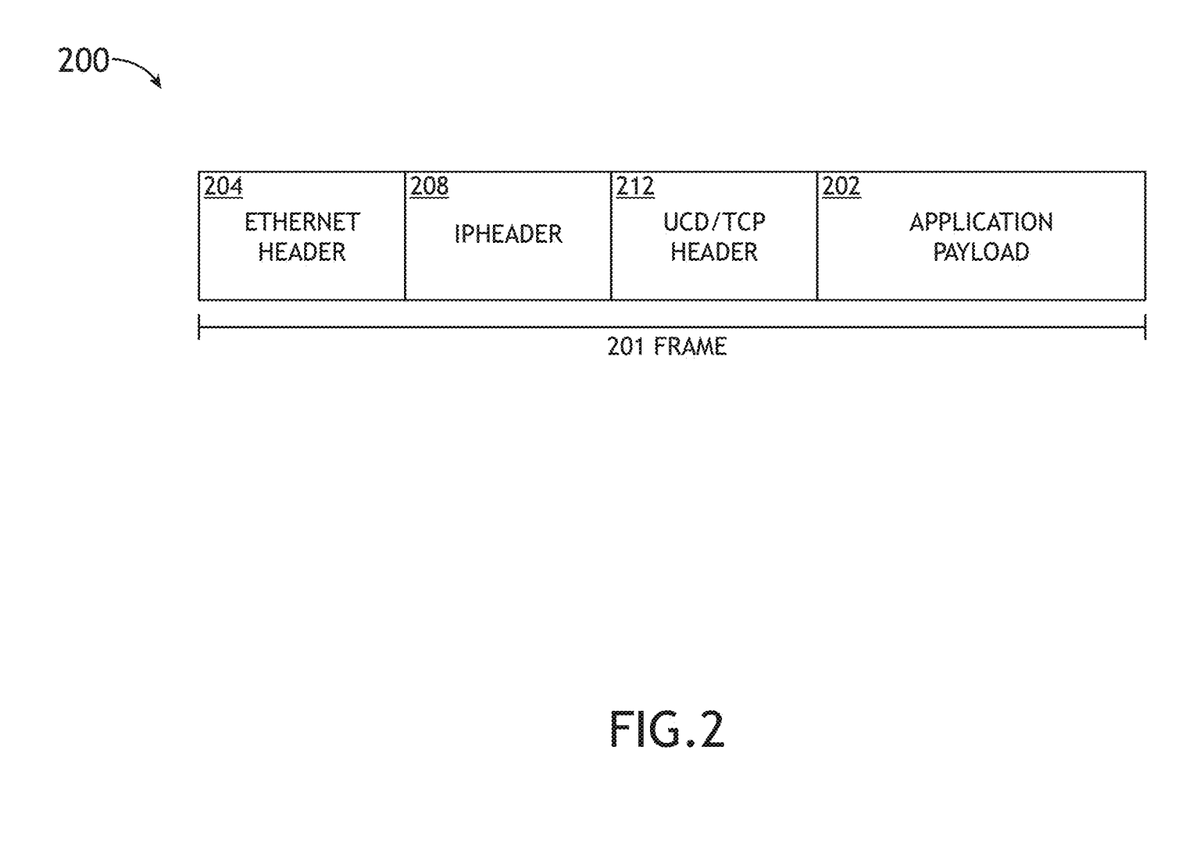
FIG. 2 is a block diagram illustrating a data packet processed by the CDS, in accordance with one or more embodiments of the disclosure.

FIG. 2 is a block diagram illustrating a data packet 200 processed by the CDS 100, in accordance with one or more embodiments of the disclosure. The CDS 100 may be configured to process any type of data structure, unit or message, such as a frame 201 (e.g., an Ethernet frame). Each data packet 200 comprises several frame structures including an application payload 202 containing the data or message to be delivered, as well as frame structures that assure delivery of the application payload 202 including but not limited to an Ethernet header 204, an internet protocol (IP) header 208, and a transmission control protocol (TCP) or user datagram protocol (UDP) header (UDP/TCP header 212). The data packet 200 may also include other frame structures and frame subcomponents including but not limited to frame check sequences, MAC headers, preambles, and the like. The data packet 200 may also be arranged to include footers structures. The footer structures may be configured as redundant structures, corresponding to a header structure, or may be configured as a relocated header (e.g., a header redesignated as a footer). For example, and for the sake of clarity, a header structure may also refer to a footer structure.

Figure 3:
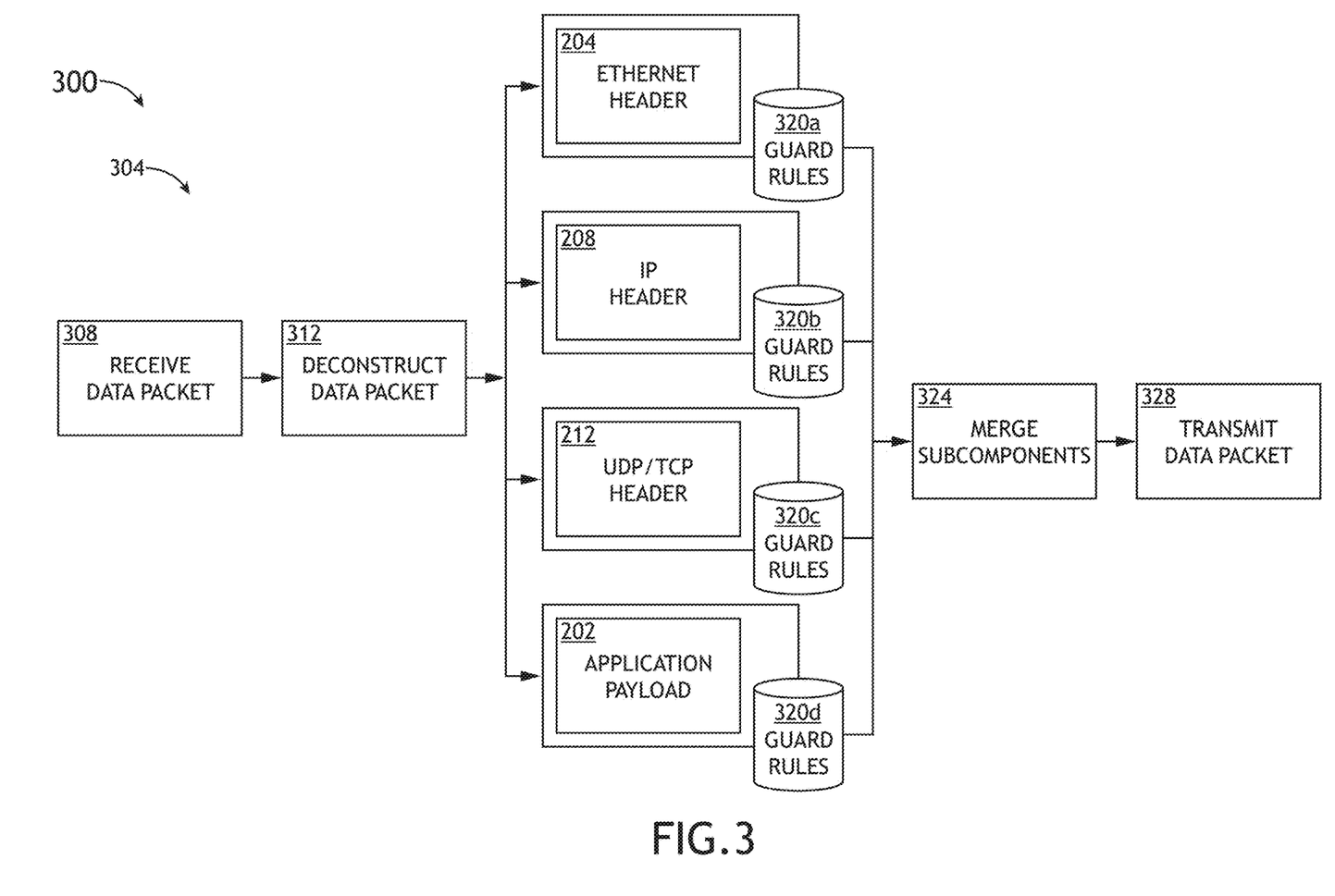
FIG. 3 is a flowchart diagram illustrating a distributed processing method for data packets, in accordance with one or more embodiments of the disclosure.

FIG. 3 is a flowchart diagram 300 illustrating a distributed processing method 304 for data packets 200, in accordance with one or more embodiments of the disclosure. The distributed nature of the method 304 increases processing efficiency of the data packet 200, ultimately increasing the rate that data packets 200 can be processed by the CDS 100. The method 304 includes a step 308 of receiving a data packet 200 (via the data input port 116). The method 304 further includes a step 308 of deconstructing the data packet 200 into two or more subcomponents. For example, the data packet 200 may be deconstructed into the ethernet header 204, the IP header 208, the UDP/TCP header 212, and the application payload 202. Deconstruction of the data packet 200 may be implemented by the one or more processors 124. Once deconstructed, each subcomponent is tracked in order to remerge data packet 200 if the data packet has been approved for transfer to another domain (e.g., the second domain 112).

The data packet 200 may be deconstructed into any subcomponent scheme. For example, the data packet 200 may be deconstructed into separate Ethernet header 204, IP header 208, UDP/TCP header 212, the application payload 202 subcomponents, as shown in FIG. 3. In another example, the data packet 200 may be deconstructed into three subcomponents. For instance, the data packet 200 may be deconstructed into an Ethernet header 204, a combined IP header 208 and UDP/TCP header 212 subcomponent, and an application payload 202. In another example, the data packet may be deconstructed into two subcomponents. For instance, the data packet may be deconstructed into a combined Ethernet header 204, IP header 208 and UDP/TCP header 212 subcomponent, and an application payload 202 subcomponent. The data packet 200 may also be deconstructed into five or more subcomponents. For example, the data packet 200 may be deconstructed separate IP header 208, UDP/TCP header 212, and application payload 202 subcomponents, with the Ethernet header 204 further deconstructed into preamble and MAC address subcomponents (e.g., six subcomponents).

The method 304 further includes a step 316 of applying a filter engine to the subcomponents to determine if the subcomponents are to be approved or rejected. The step 316 includes the implementation of guard rules 320a-d that determine the validity of each subcomponent. The guard rules 320a-d are subcomponent specific. For example, as shown in FIG. 3, Ethernet header subcomponents are processed using guard rules 320a, IP headers subcomponents are processed using guard rules 320b, UDP/TCP subcomponents are processed using guard rules 320c, and application payloads are processed using guard rules 320d. Subcomponent-specific guard rules 320 a-d may contain a smaller ruleset than traditional guard rules. By having a smaller ruleset, the subcomponent-specific guard rules can process subcomponents of data packets 200 more quickly than the traditional guard rule scheme.

The method 304 further includes a step 324 of merging the subcomponents into a data packet 200. For example, if each subcomponent of the deconstructed data packet 200 passes guard rule processing and is approved, each subcomponent will then be merged to form an approved data packet identical to the original data packet. Data packet merging can be performed via the one or more processors 124. Once the data packet 200 is merged, the method 304 performs a step 328 of transmitting the data packet 200. For example, the CDS 100 may send the approved data packet 200 to the second domain 112 via the data output port 128.

Figure 4:
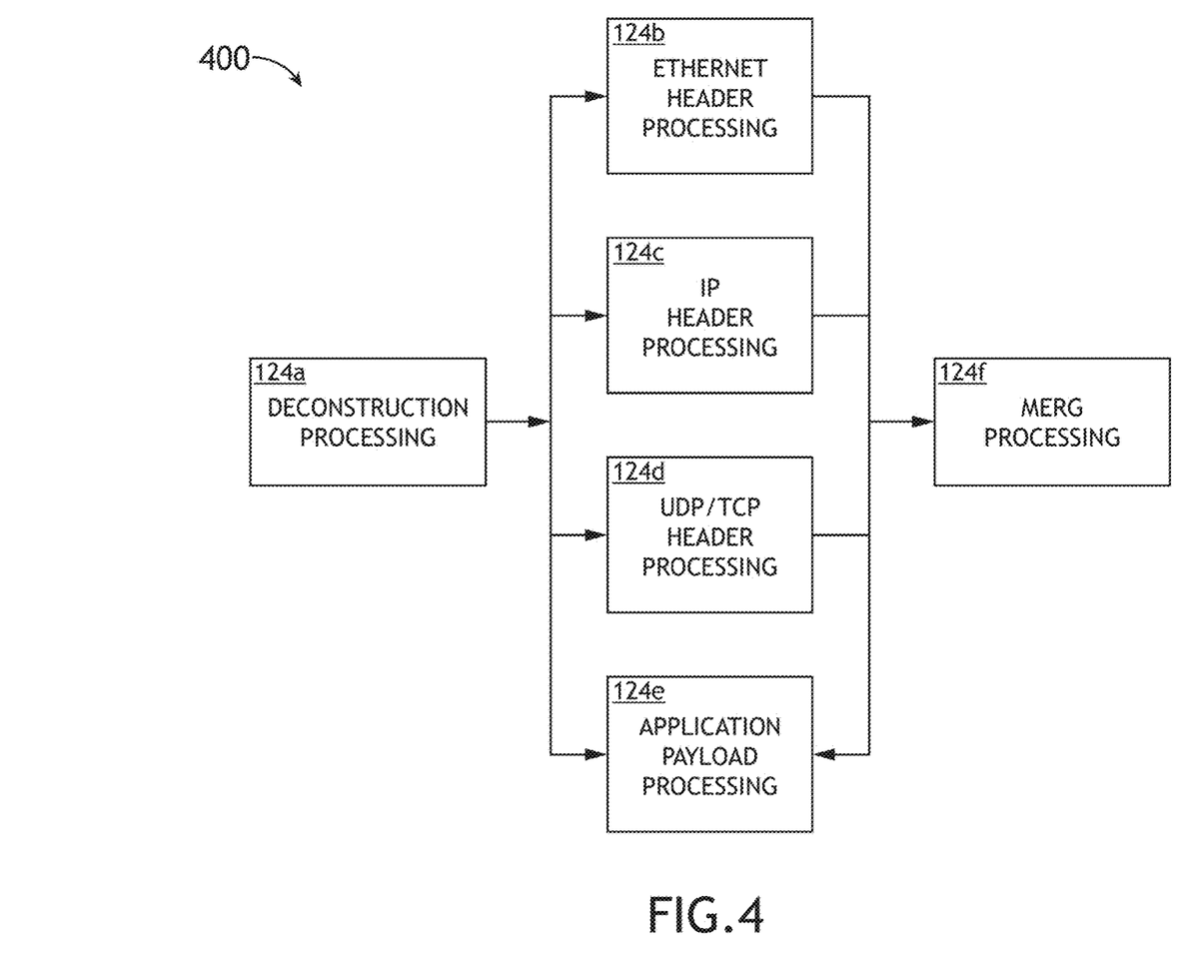
FIG. 4 is a flowchart diagram illustrating the deconstruction, guard rule analysis, and merging of data packets, in accordance with one or more embodiments of the disclosure.

The deconstruction, guard rule analysis, and merging of data packets 200 may occur on different processors 124 as shown a flowchart 400 in FIG. 4, in accordance with one or more embodiments of the disclosure. For example, deconstruction processing (e.g., of a data packet 200) may be performed on a first processor 124a, Ethernet header processing (e.g., comparing the subcomponent to Ethernet header-specific guard rules 320a) may be performed on a second processor 124b, IP header processing (e.g., comparing the subcomponent to IP header-specific guard rules 320b) may be performed on a third processor 124c, UDP/TCP header processing (e.g., comparing the subcomponent to UDP/TCP header-specific guard rules 320b) may be performed on a fourth processor 124d, application payload processing (e.g., comparing the subcomponent to application payload-specific guard rules 320b) may be performed on a fourth processor 124d, and subcomponent merge processing performed on a fifth processor 124e. The multiple processors 124a-f may be configured as multiple processing units on a same central processing units (CPU) or CPU core, may be configured as processors 124a-f located on different CPU cores, or may be configured as processors 124a-f located on different CPU cores further located on separate networked machines (e.g., networked computers).

Figure 5:
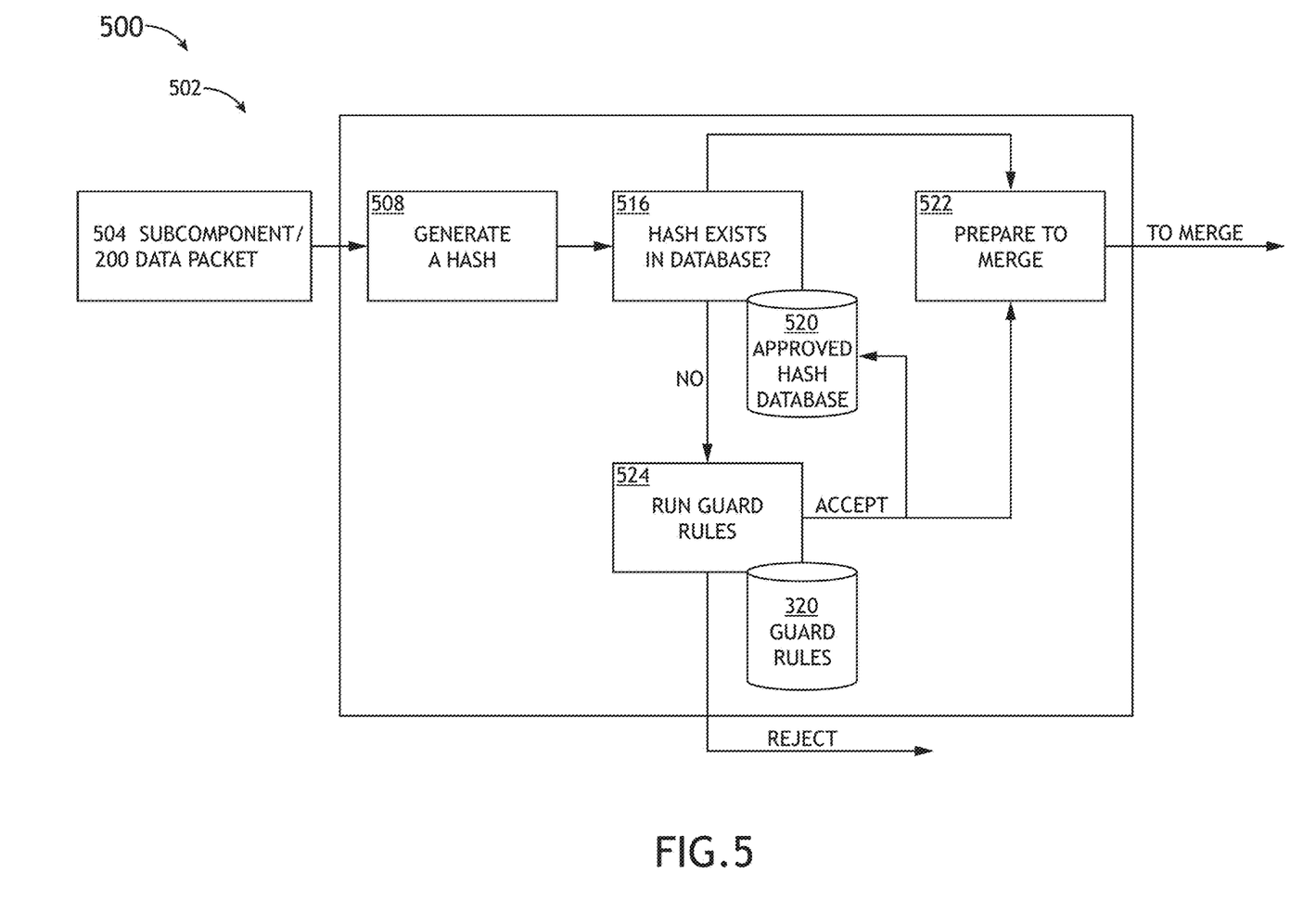
FIG. 5 is a flowchart of a method detailing the application of a filter engine to a subcomponent to determine if the subcomponent is to be approved or rejected, in accordance with one or more embodiments of the disclosure.

FIG. 5 is a flowchart 500 of a method 502 detailing the application of a filter engine 120 to a subcomponent 504 to determine if the subcomponent 504 is to be approved or rejected, in accordance with one or more embodiments of the disclosure. Specifically, the flowchart 500 follows the path of a subcomponent 504 through the approval/rejection process.

In some embodiments, the method 502 includes a step 508 of generating a hash based on the subcomponent. The generated hash may be of any fixed size value that may be used to identify the component. The hash may be generated by any hash protocol or hash function. For example, CDS 100 may utilize a secure hash algorithm such as Secure Hash Algorithm 512 (SHA-512) to convert the subcomponent, or a portion of the subcomponent, into a fixed size string (e.g., each output produces a hash length of 512 bits or 64 bytes) for efficient unique identification of a data structure.

In some embodiments, the method 502 includes a step 516 of determining if the hash exists in an approved hash database 520. The approved hash database 520 may be any data structure (e.g., a lookup table) stored in memory 130 used to store the hashes of previously approved subcomponents 504. Through the use of the hash algorithm, subcomponents containing two identical hashes may be considered to have been generated from identical subcomponents. Therefore, if a generated hash matches a hash from an approved database, the generated hash may be automatically approved as valid, and the subcomponent 504 may be prepared for merging with corresponding subcomponents 504 in step 522. Checking the approved hash database to determine if the subcomponent has previously passed inspection saves considerable time, particularly in communication systems that use redundant messaging.

If the generated hash does not match a hash from the approved hash database 520, the method 502 then performs a step 524 of applying guard rules to the subcomponent 504. For example, a subcomponent 504 configured as an Ethernet header 204 would have the Ethernet header-specific guard rule 320a applied to determine the validity of the subcomponent 504. If the subcomponent 504 is approved after the application of guard rules 32, the approved subcomponent is prepared for merging with corresponding subcomponents in accordance with step 522, and the generated hash of the approved subcomponent may be stored in the approved hash database. Components that fail to be approved (e.g., rejected components) may be deleted or logged into a rejected component database. Correspondingly, generated hashes from rejected components may be deleted or stored in a rejected hash database.

Figure 6A:
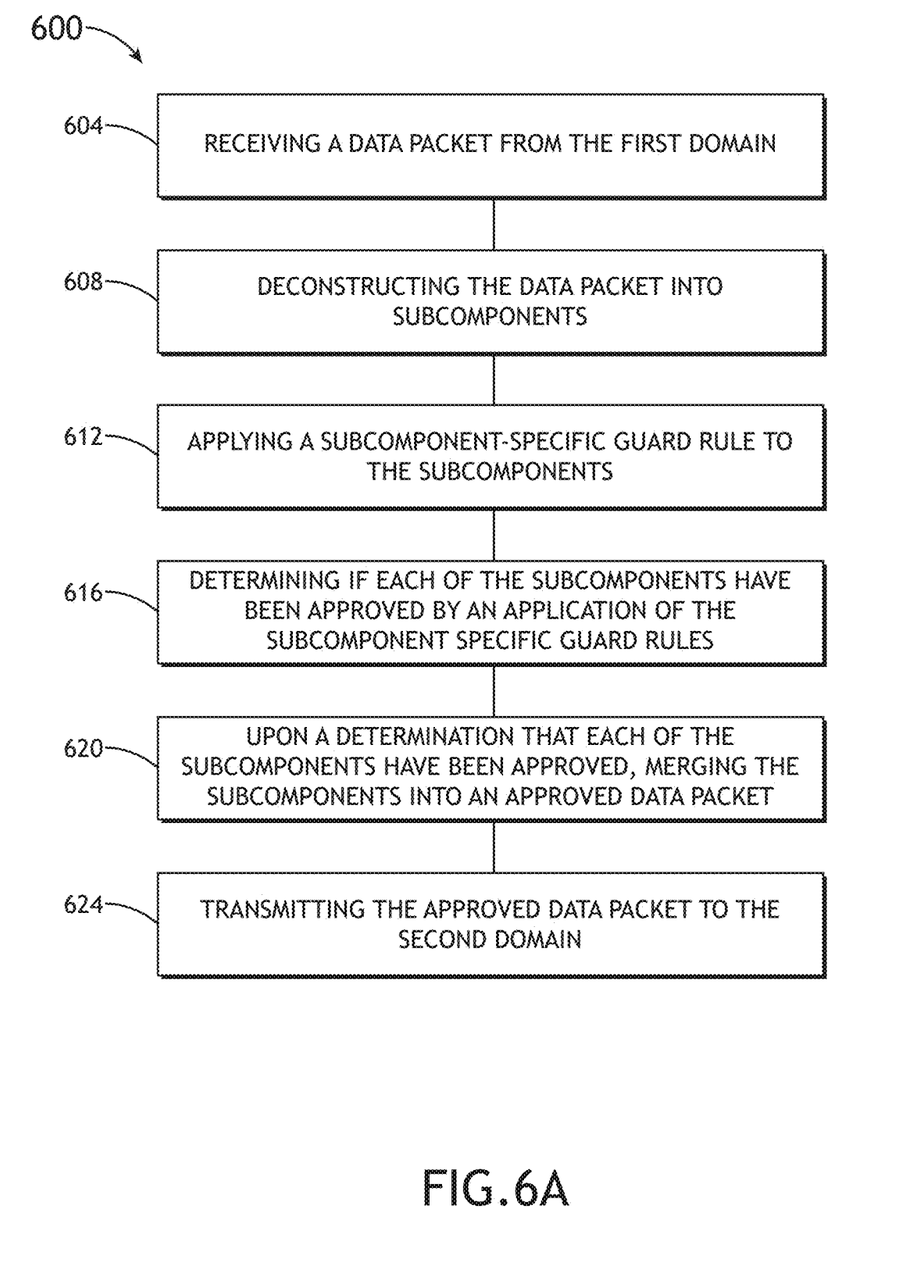
FIG. 6A-B are flowcharts illustrating a method 600 for performing cross-domain communication between at least a first domain and a second domain, in accordance with one or more embodiments of the disclosure.

FIG. 6A is a flowchart illustrating a method 600 for performing cross-domain communication between at least a first domain 108 and a second domain 112, in accordance with one or more embodiments of the disclosure. The method 600 may include one or more, or all, steps of methods 304, 502 and vice versa.

In some embodiments, the method 600 includes a step 604 of receiving a data packet from first domain 108. For example, the CDS 100 may receive data packets 200 related to mission parameters that a computer operated by a national army (e.g., the first domain 108) is sending to a computer of a coalition partner (e.g., the second domain 112).

In some embodiments, the method 600 includes a step 608 of deconstructing the data packet 200 into subcomponents 505. For example, one or more processors 124 in the CDS 100 may deconstruct, or parse, the data packet into two or more components including but not limited to the ethernet header 204, the IP header 208, the UDP/TCP header 212 and the application payload 202.

In some embodiments, the method 600 includes a step 612 of applying a subcomponent-specific guard rule 320 to the subcomponents 505. For example, for a subcomponent 505 that includes an ethernet header 204, guard rules 320a specific for the ethernet header 204 will be applied.

In some embodiments, the method 600 includes a step 616 of determining if each of the subcomponents have been approved by an application of the subcomponent-specific guard rules. For example, subcomponents 505 of the data packets 200 may be tracked so that the status of each subcomponent 505 may be determined, which would then determine the validity of the data packet. For example, if all components are determined to be valid, then the data packet will be determined to be valid. However, upon the rejection of one subcomponent 505, the entire data packet may be determined to be invalid, and therefore rejected. The tracking of the tested subcomponents may be performed via the one more processors 124, such as the merge processor 124f.

It should be understood that not all subcomponents 505 need to be tested via guard rules 320. For example, the data packet 200 may be deconstructed into four subcomponents 505 as shown herein, with one subcomponent, the IP header 208 not tested via guard rules. In another example, the data packet 200 may be deconstructed into three subcomponents, with the ethernet header 204 and the IP header remaining merged. The guard rules 320 may then test the merged subcomponent 505 using only ethernet header guard rules 320a, and not IP header guard rules 320b.

In some embodiments, the method 600 includes a step 620 of, upon a determination that each of the tested subcomponents 505 have been approved, merging the subcomponents 505 into an approved data packet. The resulting merged and approved data packet 200 will be identical to the corresponding data packet 200 in its original form (e.g., before deconstruction). The merging of the subcomponents 505 may be performed via the one or more processors 124f.

In some embodiments, the method includes a step 624 of transmitting the approved data packet 200 to the second domain 112. For example, the CDS 100 via the data output port 128, may transmit the approved data packet 200 to the coalition partner.

Figure 6B:
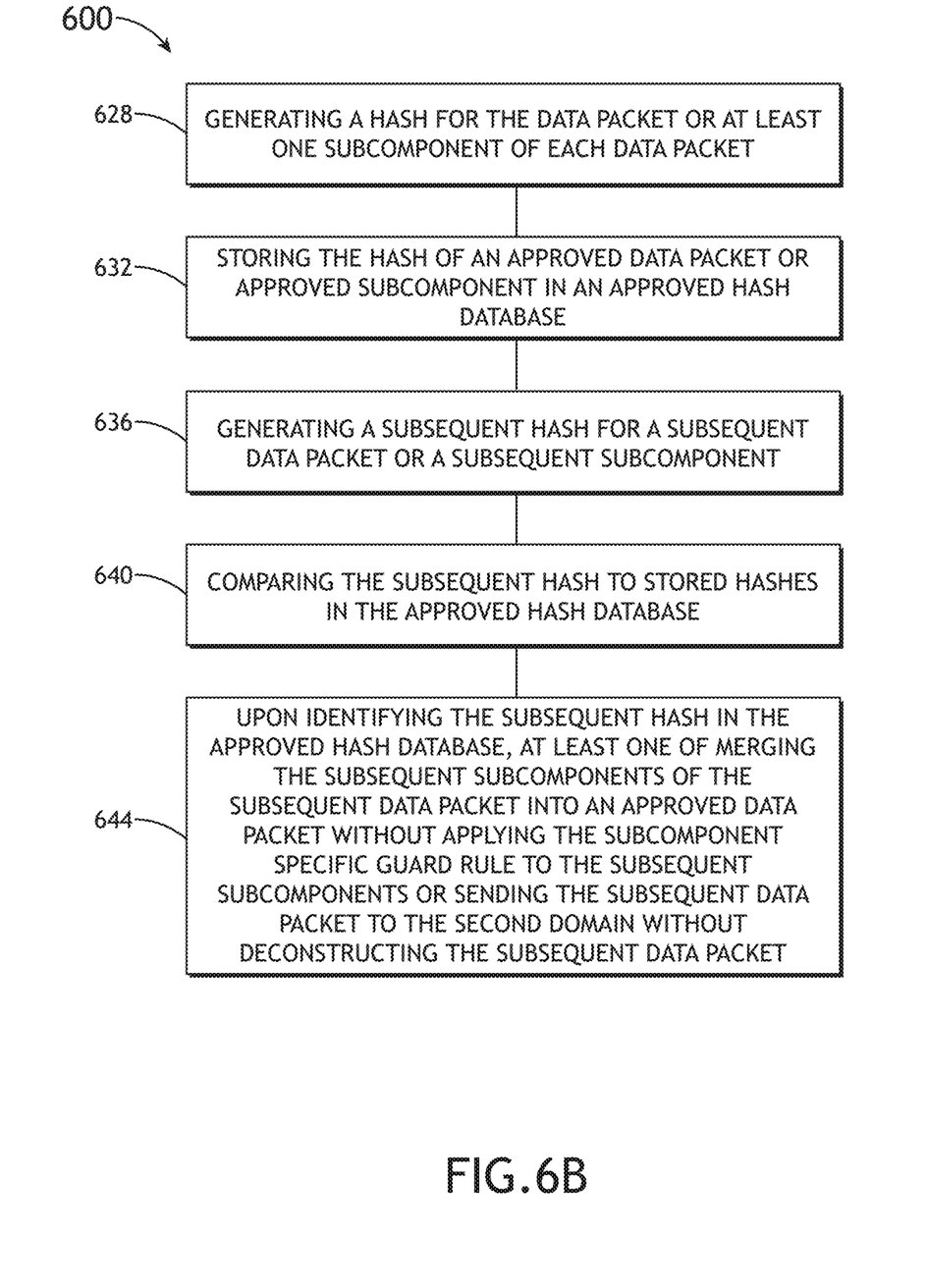

FIG. 6B further describes steps of the method 600 related to hash generation and comparison, as shown in FIG. 5, in accordance with one or more embodiments of the disclosure. In one or more embodiments, the method 600 further includes a step 628 of generating a hash for at least each data packet 200 or at least one subcomponent 505 of each data packet 200. For example, the step 628 may include utilizing the secure has algorithm SHA-512 to process the data packet 200 or subcomponent 505 to produce a hash.

In some embodiments, the method 600 further includes a step 632 of storing the hash of an approved data packet 200 or subcomponent fin a hash database 520. For example, upon the application of guard rules 320 to a subcomponent 505 and the subsequent designation of the subcomponent 505 as valid, the hash corresponding to the subcomponent may be stored in the approved hash database 520. In another example, the hash of an approved data packet 200 may be stored in the approved hash data base.

In some embodiments, the method 600 further includes a step 636 of generating a subsequent hash for a subsequent data packet 200 or a subsequent subcomponent and a step 640 of comparing the subsequent hash to stored hashes in the approved hash database. For example, the hash generated in steps 628, 632 may be compared to the subsequent hash to determine if the subsequent hash value has already been identified and approved by the guard rules.

In some embodiments, the method 600 further includes a step 644, of upon identifying the subsequent hash in the approved hash database 520, at least one of merging the subsequent subcomponents 505 of the subsequent data packet 200 into an approved data packet without applying the subcomponent specific guard rule 320 to the subsequent subcomponents 505 or sending the subsequent data packet 200 to the second domain 112 without deconstructing the subsequent data packet 200. For example, if the subsequent data packet 200 is identical to a data packet 200 received and approved in the past, there is no need for the data packet 200 to be processed by the filter engine 120 via guard rules 320. Therefore, a subsequent data packet 200 having a hash value identical to an already-approved hash value may be sent directly to the second domain 112. In another example, if individual subcomponents 505 are given hash values, and the hash value of a subsequent subcomponent 505 is identical to an already-approved hash value, then the subsequent subcomponent 505 may be immediately merged to corresponding subcomponents 505 and sent to the second domain 112 without having guard rules applied. Hashes of data packets 200 or subcomponents 505 that have been rejected may be deleted or stored/logged into a reject database. The hash system increases CDS 100 efficiency by reducing the application of guard rules 320 to redundant data packets 200. If the CDS 100 determines that the subsequent hash is not in the approved hash database 520, then the method proceeds to step 612 of applying a subcomponent-specific guard rule 320 to the subcomponents 505.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method for performing cross-domain communication between at least a first domain and a second domain comprising:
   receiving a data packet from the first domain, wherein the data packet comprises an Ethernet header, an IP header, a UDP/TCP header, and an application payload;
   deconstructing the data packet into subcomponents, wherein deconstructing the data packet into the subcomponents comprises deconstructing the data packet into a first subcomponent, a second subcomponent, a third subcomponent, and a fourth subcomponent, wherein the first subcomponent, the second subcomponent, the third subcomponent, and the fourth subcomponent correspond to the Ethernet header, the IP header, the UDP/TCP header, and the application payload, respectively;
   applying a corresponding one of subcomponent-specific guard rules to each of the subcomponents;
   determining if each of the subcomponents has been approved by an application of the corresponding one of the subcomponent-specific guard rules;
   upon a determination that each of the subcomponents has been approved, merging the subcomponents into an approved data packet;
   transmitting the approved data packet to the second domain;
   generating a hash for each of the subcomponents of the data packet;
   storing, in an approved hash database, the hash for each of the subcomponents;
   deconstructing a subsequent data packet into subsequent subcomponents;
   generating a subsequent hash for each of the subsequent subcomponents;
   comparing the subsequent hash for each of the subsequent subcomponents to stored hashes in the approved hash database; and
   upon identifying the subsequent hash for each of the subsequent subcomponents in the approved hash database, merging the subsequent subcomponents of the subsequent data packet to form a subsequent approved data packet without applying the corresponding one of the subcomponent-specific guard rules to each of the subsequent subcomponents.

2. The method of claim 1, wherein the first domain comprises at least one first security classification, and the second domain comprises at least one second security classification different from the first security classification.

3. The method of claim 1, wherein upon a determination that the subsequent hash is not identified in the approved hash database, continuing to apply the corresponding one of the subcomponent-specific guard rules to each of the subcomponents of the subsequent data packet.

4. The method of claim 1, wherein upon a determination that each of the subcomponents are not approved, rejecting the data packet.

5. The method of claim 4, further comprising logging the rejected data packet in a rejection database.

6. The method of claim 1 further comprising sending each of the subcomponents to a corresponding one of subcomponent-specific processing units.

7. A system for cross-domain communication between at least a first domain and a second domain comprising:
   a data input port for receiving a data packet from the first domain;
   a data output port; and
   a controller configured to receive the data packet and to output an approved data packet to the data output port, comprising:
      one or more processors; and
      a memory with instructions stored upon that, when executed by the one or more processors, cause the one or more processors to:
         receive the data packet from the first domain, wherein the data packet comprises an Ethernet header, an IP header, a UDP/TCP header, and an application payload;
         deconstruct the data packet into subcomponents, wherein deconstructing the data packet into the subcomponents comprises deconstructing the data packet into a first subcomponent, a second subcomponent, a third subcomponent, and a fourth subcomponent, wherein the first subcomponent, the second subcomponent, the third subcomponent, and the fourth subcomponent correspond to the Ethernet header, the IP header, the UDP/TCP header, and the application payload, respectively;
         apply a corresponding one of subcomponent-specific guard rules to each of the subcomponents;
         determine if each of the subcomponents has been approved by an application of the corresponding one of the subcomponent-specific guard rules;
         upon a determination that each of the subcomponents has been approved, merge the subcomponents into the approved data packet;
         transmit the approved data packet to the data output port;
         generating a hash for each of the subcomponents of the data packet;
         storing, in an approved hash database, the hash for each of the subcomponents;
         deconstructing a subsequent data packet into subsequent subcomponents;
         generating a subsequent hash for each of the subsequent subcomponents;
         comparing the subsequent hash for each of the subsequent subcomponents to stored hashes in the approved hash database; and
         upon identifying the subsequent hash for each of the subsequent subcomponents in the approved hash database, merging the subsequent subcomponents of the subsequent data packet to form a subsequent approved data packet without applying the corresponding one of the subcomponent-specific guard rules to each of the subsequent subcomponents.

8. The system of claim 7, wherein the first domain comprises at least one first security classification, and the second domain comprises at least one second security classification different from the first security classification.

9. The system of claim 7, wherein the one or more processors includes one or more filter engines configured to apply the corresponding one of the subcomponent-specific guard rules to each of the corresponding subcomponents.

10. The system of claim 9, wherein two or more subcomponents from a same packet are processed by the one or more filter engines on separate processors.

\* \* \* \* \*